(12) United States Patent
Anand et al.

(10) Patent No.: US 11,861,397 B2
(45) Date of Patent: Jan. 2, 2024

(54) CONTAINER SCHEDULER WITH MULTIPLE QUEUES FOR SPECIAL WORKLOADS

(71) Applicant: Kyndryl, Inc., New York, NY (US)

(72) Inventors: Vishal Anand, Dublin (IE); Michael David Williams, Gardiner, NY (US)

(73) Assignee: Kyndryl, Inc., New York, NY (US)

( * ) Notice: Subject to any disclaimer, the term of this patent is extended or adjusted under 35 U.S.C. 154(b) by 531 days.

(21) Appl. No.: 17/175,737

(22) Filed: Feb. 15, 2021

(65) Prior Publication Data

US 2022/0261277 A1   Aug. 18, 2022

(51) Int. Cl.
*G06F 9/48* (2006.01)
*G06F 9/50* (2006.01)

(52) U.S. Cl.
CPC .......... *G06F 9/4881* (2013.01); *G06F 9/5027* (2013.01)

(58) Field of Classification Search
CPC .............................. G06F 9/4881; G06F 9/5027
See application file for complete search history.

(56) References Cited

U.S. PATENT DOCUMENTS

| | | | | |
|---|---|---|---|---|
| 6,542,511 B1 * | 4/2003 | Livermore | .......... | H04L 12/2801 370/258 |
| 10,810,143 B2 * | 10/2020 | Knauft | .................. | H04L 47/30 |
| 11,314,547 B1 * | 4/2022 | Tang | .................. | H04L 67/1097 |
| 2021/0141623 A1 * | 5/2021 | Bequet | .................. | G06F 9/546 |
| 2021/0263779 A1 * | 8/2021 | Haghighat | ............... | G06F 21/78 |
| 2023/0034835 A1 * | 2/2023 | Reyes | .................. | G06F 9/5027 |
| 2023/0138344 A1 * | 5/2023 | Bequet | ................. | H04L 67/125 718/104 |

FOREIGN PATENT DOCUMENTS

| | | |
|---|---|---|
| WO | 2016118164 A1 | 7/2016 |
| WO | 2020000944 A1 | 1/2020 |

OTHER PUBLICATIONS

"Assigning Pods to Nodes", Kurbernetes, Last modified Jul. 15, 2020, website, 12 pages. https://kubernetes.io/docs/concepts/configuration/assign-pod-node/.
"Configure Multiple Schedulers", Kubernetes, Last modified Aug. 7, 2020, website, 11 pages. https://kubernetes.io/docs/tasks/extend-kubernetes/configure-multiple-schedulers/.

(Continued)

*Primary Examiner* — Benjamin C Wu
(74) *Attorney, Agent, or Firm* — CANTOR COLBURN LLP; Dan Housley

(57) ABSTRACT

A computer-implemented method to schedule special containers using a multi-queue scheduler. The method includes receiving, by a scheduler, a first pod including a first container including a first queue, a second queue, an event handler, and an error handler. The method further includes obtaining a set of characteristics for the first pod and determining that the first pod is a special pod. The method includes adding the first pod to the first queue, wherein the first queue is a special queue and includes a special function. The method also includes initiating the special function. The method further includes assigning, based on one or more placement rules, the first pod to a first node of a plurality of nodes.

20 Claims, 5 Drawing Sheets

(56) References Cited

OTHER PUBLICATIONS

"How does the Kubernetes scheduler work?", Julia Evans, printed Dec. 8, 2020, website, 6 pages. https://jvns.ca/blog/2017/07/27/how-does-the-kubernetes-scheduler-work/.

Beltre et al., "KubeSphere: An Approach to Multi-Tenant Fair Scheduling for Kubernetes Clusters", Conference Paper—Aug. 2019, Research Gate, 7 pages.

Lahu, "Dynamic Resources allocation using Priority Aware scheduling in Kubernetes", National College of Ireland, 2018-2019, Submitted Dec. 12, 2019, 42 pages.

Hu et al., "Concurrent container scheduling on heterogeneous clusters with multi-resource constraints", Science Direct, Future Generation Computer Systems, vol. 102, Jan. 2020, 12 pages. https://www.sciencedirect.com/science/article/pii/S0167739X19309446.

"Scheduling Framework", Kubernetes, Last modified Oct. 14, 2020, website, 6 pages. https://kubernetes.io/docs/concepts/scheduling-eviction/scheduling-framework/.

Mell et al., "The NIST Definition of Cloud Computing", Recommendations of the National Institute of Standards and Technology, Special Publication 800-145, Sep. 2011, 7 pages.

\* cited by examiner

US 11,861,397 B2

CONTAINER SCHEDULER WITH MULTIPLE QUEUES FOR SPECIAL WORKLOADS

BACKGROUND

The present disclosure relates to cloud computing, and, more specifically, a multi-queue container scheduler.

Containers and container orchestration are utilized to effectively and efficiently accomplish cloud computing tasks. A container is a ready to run software package that can be sent from a host and run on a node. Each container can include all features required to run an application. The container can be imaged onto any set of hardware that is capable of running the software included in a container.

SUMMARY

Disclosed is a computer-implemented method to schedule special containers in a multi queue scheduler. The method includes receiving, by a scheduler, a first pod including a first container, wherein the scheduler includes a first queue, a second queue, an event handler, and an error handler. The method further includes obtaining a set of characteristics for the first pod. The method further includes determining, based on the set of characteristics, that the first pod is a special pod. The method includes adding the first pod to the first queue, wherein the first queue is a special queue and includes a special function. The method also includes initiating the special function for the first pod based on the determining. The method further includes assigning, based on one or more placement rules, the first pod to a first node of a plurality of nodes. Further aspects of the preset disclosure are directed to computer program products containing functionality consistent with the method described above.

Further aspects of the preset disclosure are directed to a cloud computing system with a multi queue container scheduler. The system includes a plurality of nodes including a first node and a second node, wherein the first node is configured to run one or more standard containers and the second node is configured to run one or more special containers. The system also includes a container scheduler to manage a lifecycle of a plurality of pods, where each pod of the plurality of pods includes one or more containers. The scheduler includes, a processor and a computer-readable storage medium communicatively coupled to the processor and storing program instructions. The scheduler further includes a first queue configured to assign each pod in the first queue to the first node based on a set of scheduling rules, wherein each pod in the first queue is a standard pod. The schedule also includes a second queue configured to assign each pod in the second queue to the second node based on the set of scheduling rules, wherein each pod in the second queue is a special pod. The scheduler includes an event handler configured to receive each pod of the plurality of pods, obtain a set of characteristics for each pod, assign each special pod to the second queue, and send each standard pod to the first queue. The scheduler further includes an error handler configured to determine that a pod has been terminated from a node, send each special pod to the second queue, and send each standard pod to the first queue.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
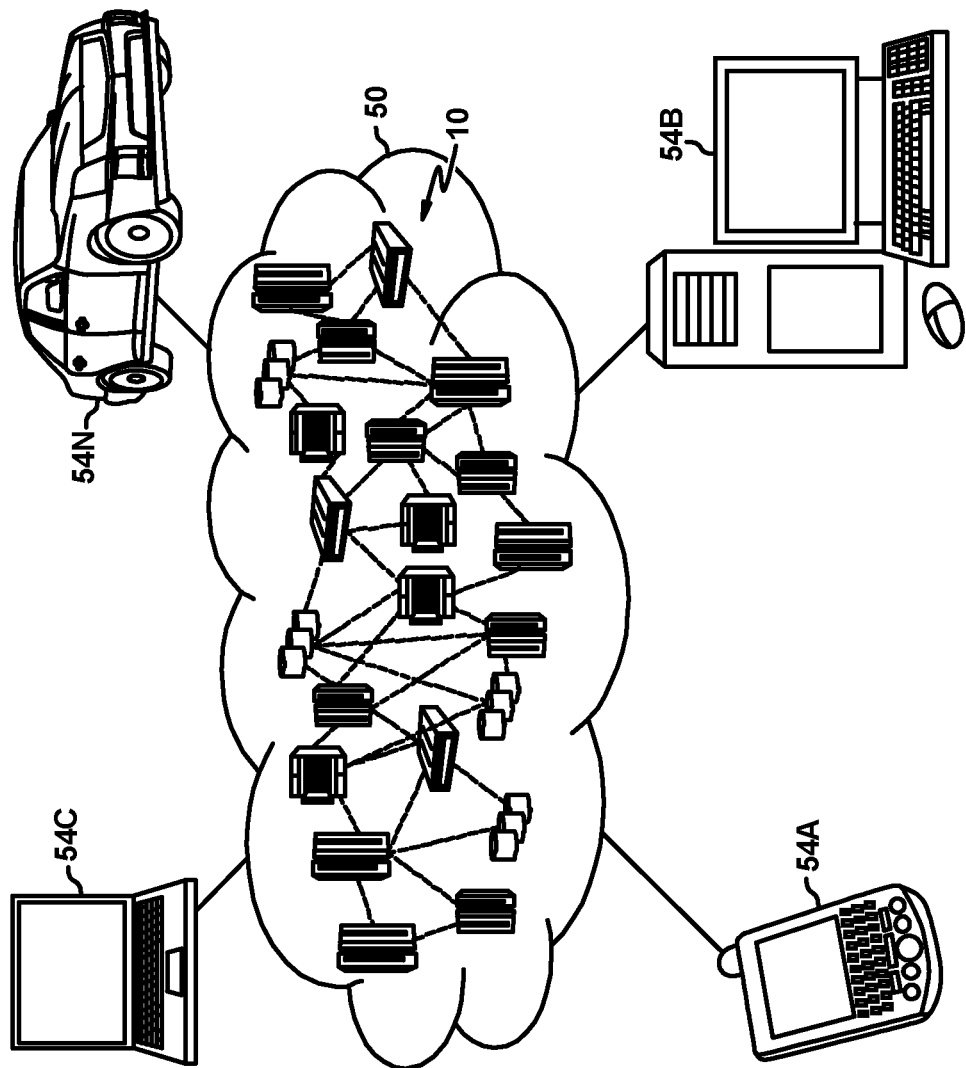
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
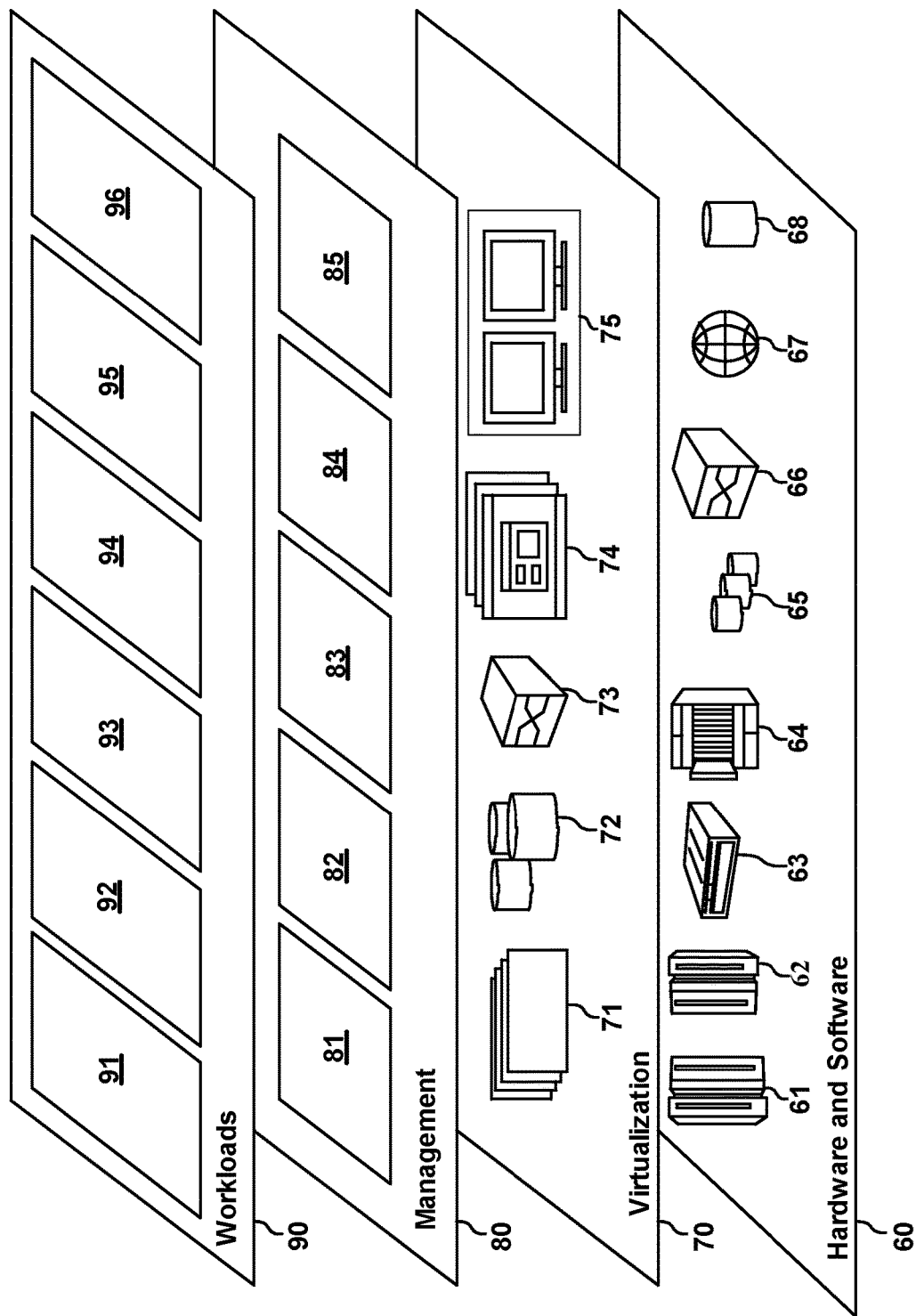
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
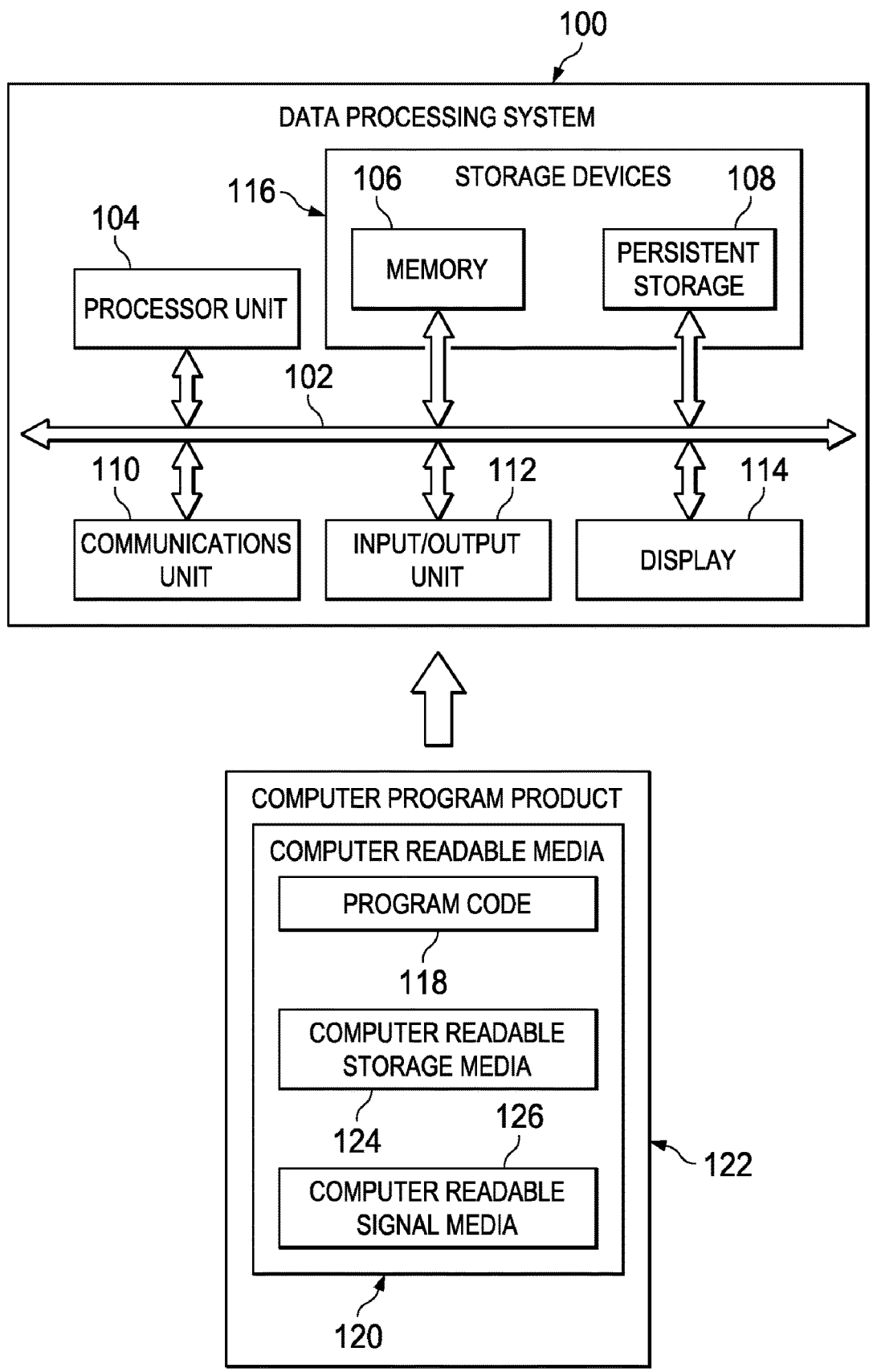
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Multiple Special Function Queues in a Scheduler

Containers and container orchestration are utilized to effectively and efficiently accomplish cloud computing tasks. A container is a ready-to-run software package that can be sent from a host and run/operated/performed on a node. Each container can include all features required to run an application. The container can be imaged onto any set of hardware that is capable of running the software included in a container. Each container is included in a pod. Each pod can include more than one container, however for purposes of this application they will generally be considered to have a 1:1 ratio. In some embodiments, pods can be defined as a self-contained deployable unit managed by a container orchestration solution.

A container orchestration solution (a "container manager") can be designed to distribute containers/pods onto one or more remote computing nodes (or "nodes"). Various embodiments allow for constraints and/or rules that dictate how and when pods are distributed and executed on one or more different nodes. The distribution can be based on several factors. The factors can include CPU type, node type, disk type, node hardware, pod configuration, node configuration, and other similar factors.

Generally, container orchestration managers can include a scheduler. The scheduler can manage how pods are distributed to which nodes. In some embodiments, the scheduler includes several components to perform the distribution of pods such as an event handler, an error handler, and a pod queue. Each scheduler can contain one of each component. For example, a newly created and/or terminated pod can be handled by one queue, one error handler, and one event handler. However, having a single queue can cause higher priority pods to get less favorable placement, later deployment based on location in the queue, and/or a less efficient distribution than pods that precede the higher priority pods in the queue. Additionally, creating a complete scheduler for the higher priority pods can greatly increase the usage of computational resources.

Embodiments of the present disclosure can include a scheduler that has two or more separate queues in one scheduler. All of the queues in the scheduler can share the remaining scheduler components. This can be an improvement on previous systems, where a second queue would require additional time and resources to build and execute all of the additional components within a second scheduler (e.g., second error handler, etc.). Additionally, a second scheduler will consume the resources to generate and run additional pods. A single container cannot be managed by more than one container manager.

In some embodiments, the two queues in the scheduler can be configured to manage different types of pods. In some embodiments, one queue can be a standard pod queue (or standard queue), and the other queue can be a special function pod queue (or special queue). In some embodiments, one queue can be a first special queue for a first pod type and the second queue can be a second special queue for a second pod type. The two queues can share the remaining resources of the scheduler (e.g., event handler). The other components of the scheduler can be configured to identify a special pod and a standard pod. For example, the event handler and error handler can identify when a pod is a special pod, and/or which type of special pod and send it to the appropriate queue.

In some embodiments, one or more of the queues can include a special function. Said differently, the queues can be associated to pod level requirements. For example, if a pod includes regulated data, the pod can include regulatory compliant workloads. The container manager can then sort the pod into a queue based on the regulatory framework related to the pod. Embodiments of the present disclosure can include regulatory aware handling (e.g., placement, management, etc.) of pods.

In some embodiments, the container manager can be configured to identify special function pods/containers. In some embodiments, a pod can be special based on an indication of being special. The indication can be added to the pod upon creation by a human and/or an application. In some embodiments, a pod can be identified as special based on an application included in the pod. For example, if the application is a financial application than the pod can be considered special. As another example, if the application is related to processing personal information of users, the pod can be special. In some embodiments, the pod can be special if the pod is subject to regulations. The regulations can be government regulation (e.g., laws, regulations, etc.) and/or organization regulations (e.g., corporation mandated monitoring). In some embodiments, a pod can be special if it requires a particular set of components to run on the node (e.g., hardware and/or software). In general, any predefined characteristics or attributes associated with the pod may be used to designate it as special.

The aforementioned advantages are example advantages, and embodiments exist that can contain all, some, or none of the aforementioned advantages while remaining within the spirit and scope of the present disclosure.

Figure 4:
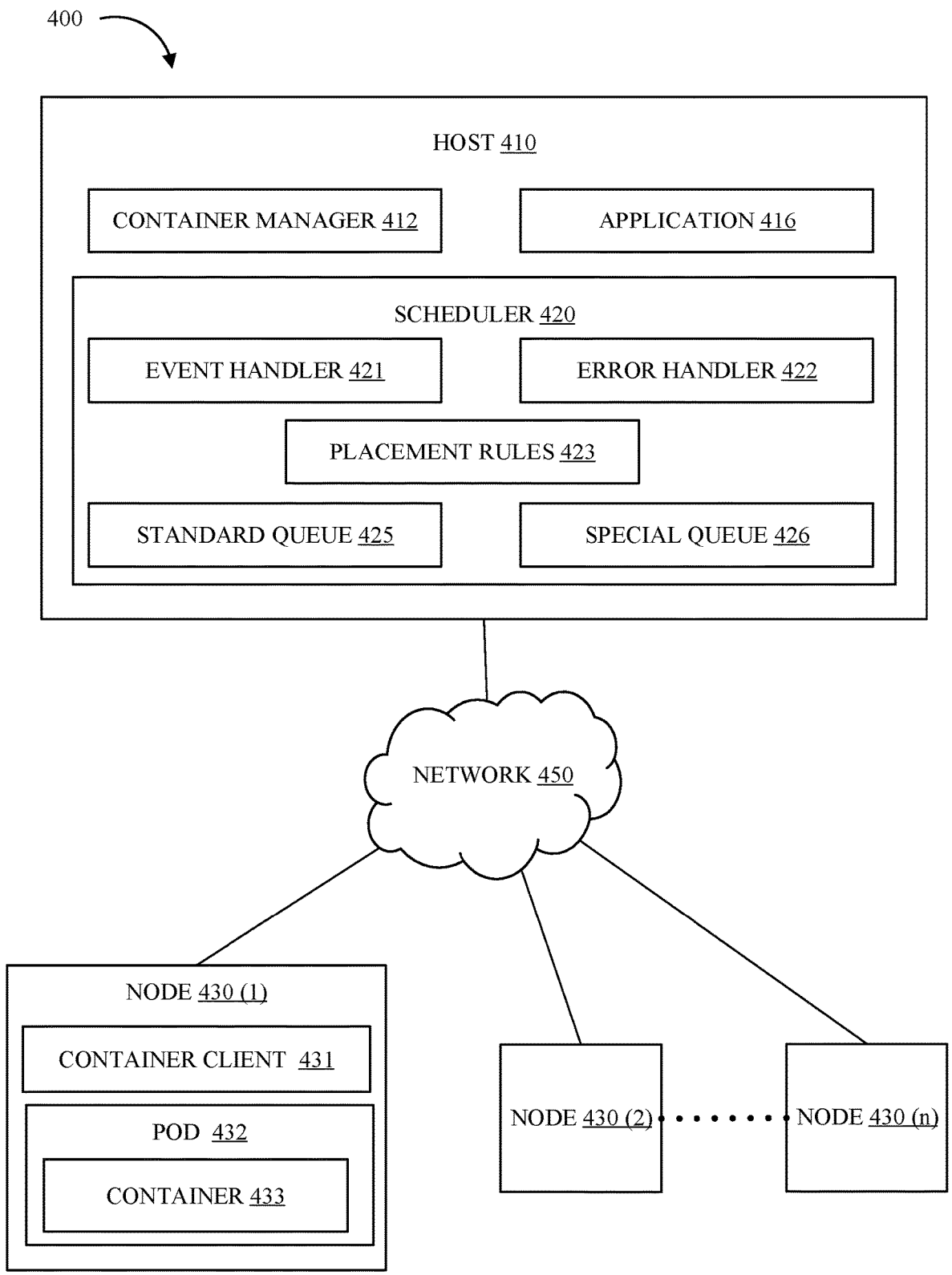
FIG. 4 illustrates a functional diagram of a computing environment suitable for operation of a container manager in accordance with some embodiments of the present disclosure.

Referring now to various embodiments of the disclosure in more detail, FIG. 4 is a representation of a computing environment 400 that is capable of running a container manager in accordance with one or more embodiments of the present disclosure. Many modifications to the depicted environment may be made by those skilled in the art without departing from the scope of the disclosure.

Computing environment 400 includes host 410, node 430 (1), node 430 (2), through node 430 (*n*), where n is an integer, and network 450. Node 430 (1), node 430 (2), through node 430 (*n*) can be referred to, individually and/or representatively as nodes 430.

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, nodes 430, and other computing devices (not shown) within computing environment 400. In some embodiments, each of host 410, and/or nodes 430 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment. In some embodiments, host 410 includes container manager 412, application 416, and scheduler 420.

Container manager 412 can be any combination of hardware and/or software configured to operate the lifecycle of containers (e.g., container 433). In some embodiments, container manager 412 controls and automates tasks including, but not limited to, provisioning and deployment of containers, redundancy and availability of containers, allocation of resources between containers, movement of containers across a host infrastructure, and load balancing between containers and/or nodes 430. In some embodiments, container manager 412 includes a container orchestration system (e.g., Kubernetes®). In some embodiments, one or more of application 416 and scheduler 420 are included in container manager 412. They are shown separately for description purposes.

Application 416 can be any combination of hardware and/or software configured to carry out a function on a computing device (e.g., host 410). In some embodiments, application 416 is a web application. In some embodiments, application 416 can be packaged in one or more pods. In some embodiments, application 416 can represent any number of separate applications. The applications can be combined/grouped into one or more pods or containers. In some embodiments, application 416 can initiate the generation of a pod.

Scheduler 420 can be any combination of hardware and software configured to distribute pods/containers to a node within computing environment 400. In some embodiments, scheduler 420 identifies pods and distributes the pods to a node. The identified pods can be newly created pods and/or terminated/failed pods (e.g., node failure). In some embodiments, scheduler 420 can determine a pod is a special pod and/or determine a particular node is a special node. Any pod that is not a special pod can be a standard pod. In some embodiments, a pod can be special based on an indication of being special. The indication can be added to the pod upon creation by a human and/or an application, and may be designated as special according to the description above.

In some embodiments, scheduler 420 includes event handler 421, error handler 422, placement rules 423, standard queue 425, and special queue 426.

Event handler 421 can be any combination of hardware and/or software configured to identify a pod sent to/created by scheduler 420 and/or container manager 412. In some embodiments, event handler 421 can determine a pod is available to be distributed to a node. In some embodiments, event handler 421 can determine if the container is a special container/pod. The determination can be based on data within the pod. Event handler 421 can analyze the pod to determine if it meets any criteria to be considered a special pod.

Error handler 422 can be any combination of hardware and/or software configured to manage a terminated/failed pod. On occasion, a pod will be terminated from a node (e.g., power failure at node, etc.). Error handler 422 can identify the pod is no longer running on the node and resend the pod to a queue. In some embodiments, error handler 422 can determine if the pod is a standard pod and/or a special pod. In some embodiments, error handler 422 can perform similar functions as event handler 421. However, error handler 422 handles pods that are being returned from a node. For example, if a special pod is terminated, error handler 422 can identify the special pod and send the special pod to special queue 426 to be redistributed to a node.

Placement rules 423 can be a set of instruction that direct how container manager 412 distributes pods to nodes (e.g., nodes 430). In some embodiments, placement rules 423 includes one or more configuration files (e.g., YAML Ain't Markup Language (YAML) configuration files). Placement rules 423 can be edited/updated. In some embodiments, placement rules 423 can include a standard rule set and a special rule set. The special rule set can be rules that are applied to special pods and/or pods in special queue 426. In some embodiments, special rule set can be used to distribute special pods to special nodes.

Standard queue 425 can store one or more pods to be distributed to a node. In some embodiments, standard queue 425 receives pods from event handler 421 and/or error handler 422. Standard queue 425 can identify characteristics of the pod, compare the characteristics of the pod against placement rules 423, determine availability of nodes 430, and/or determine the capabilities (e.g., disk type, etc.) of nodes 430. In some embodiments, standard queue 425 can send a pod to a node that satisfies all the rules, availability and/or capability limitations of the pod.

Special queue 426 can be consistent with standard queue 425 with the exception that it handles special pods instead of standard pods. In some embodiments, special queue 425 can receive special pods from event handler 421 and/or error handler 422. In some embodiments, special queue 426 only sends/assigns special pods to special nodes. In some embodiments, special pods can be sent to any node (e.g., special node and standard node). This can be based on the special rule set of placement rules 423.

In some embodiments, special queue 426 can include one or more special functions. The special functions can be toggled on and off. One example of a special function includes key management. The key management special function can manage a life cycle of encryption keys. This can include key storage, key distribution, key rotation, and key revocation for each pod. The container may only be valid (for the host and/or the node) as long as it includes a valid key.

Another example special function includes a vulnerability scanner. The vulnerability scanner can analyze the node and/or container to identify potential security vulnerabilities and/or errors. An identified vulnerability can cause special queue 426 to remove the pod from the queue without assigning it to a node. It may also notify (e.g., error message, email, etc.) the source of the identified vulnerability.

Another example special function can include a compliance manager. The compliance manager can detect and mitigate regulatory risks. For example, if a container is configured to process personal information, the compliance manager can ensure appropriate permissions have been obtained prior to deploying the pod.

In some embodiments, the one or more special functions can be used for one pod collectively (e.g., one pod can utilize all or some of the special functions). In some embodiments, the one or more special functions can be applied to a single pod (e.g., each pod is associated to one special function).

In some embodiments, standard queue 425 and special queue 426 both include special functions. Said differently, both queues can be special function queues (e.g., a first special queue and a second special queue). The special functions can be different. For example, a first special queue can have a vulnerability special function and a second special queue can have a personal information regulatory special function. Placement rules 423 can be configured to accurately place pods from either queue.

In some embodiments, special functions can overlap. For example, the first special queue can have a key management and personal information regulatory special function, and the second special queue can have a key management and financial transaction regulatory special function.

Node 430 (1) can be any combination of hardware and/or software configured to run one or more pods. In some embodiments, node 430 (1) can be a standalone computing device, a management server, a web server, a mobile computing device, or any other electronic device or computing system capable of receiving, sending, and processing data. In some embodiments, node 430(1) can represent a server computing system utilizing multiple computers as a server system, such as in a cloud computing environment. In some embodiments, nodes 430 (1) includes container client 431, and pod 432.

Container client 431 can be any combination of hardware and/or software configured to run a container on a node. In some embodiments, container client 431 works complementarily with container manager 412. Container client 431 can be a node agent that runs on each node and/or a container runtime agent (e.g., Kubelet® as an agent to Kubernetes®).

Container client 431 can interface with container manager 412 to receive and execute containers as instructed by container manager 412. Container client 431 can receive one or more pods from container manager 412 and/or scheduler 420.

Pod 432 can be a virtual structure configured to transfer containers between a host (e.g., host 410) and a node (e.g., node 430 (1)). In some embodiments, a pod can include one or more containers. However, a single container is depicted for discussion purposes. In some embodiments, pod 432 is a special pod, and will include a special container.

Container 433 can be any combination of hardware and/or software configured to run an application on a remote node. A container can be a software package that includes the necessary instructions and/or data to perform a specified task. It can include a runtime, all system libraries, and application libraries needed to fully accomplish the task of the application.

Node 430 (2) and node 430 (n) can be consistent with node 430 (1) (e.g., they can contain a client, a pod, and a container). In some embodiments, one or more or nodes 430 is a standard node, and one or more of nodes 430 is a special node. For example, nodes 430 (1) through 430 (3) can be standard nodes and nodes 430 (4) and 430 (5) can be special nodes. This example is not limiting—in various embodiments, any number of nodes can be normal node and any number can be special nodes in no particular order (e.g., odds nodes are special, even numbered nodes are standard). A special node can be configured to run special pod and/or a special container. Special nodes can include particular hardware and/or software that is designed to run one or more containers. The particular hardware and/or software can be for security, processing speed, location, and/or other similar factors. For example, a governmental regulation may limit the location where personal data of a customer can be sent. The special node can be a node located in a particular location (e.g., in the same geographical boundary as the host). As another example, the special node may contain a particular security system (e.g., encryption, key management, etc.). In some embodiments, a special node can accept and run a standard pod. In these embodiments, the standard pod can be removed and replaced by container manager 412. The replacement can be in response to a new special pod being received by special queue 426. The replaced standard pod can be returned to the standard queue 425 and reassigned. This allows for the higher priority special pods to fully utilize the special nodes.

Figure 5:
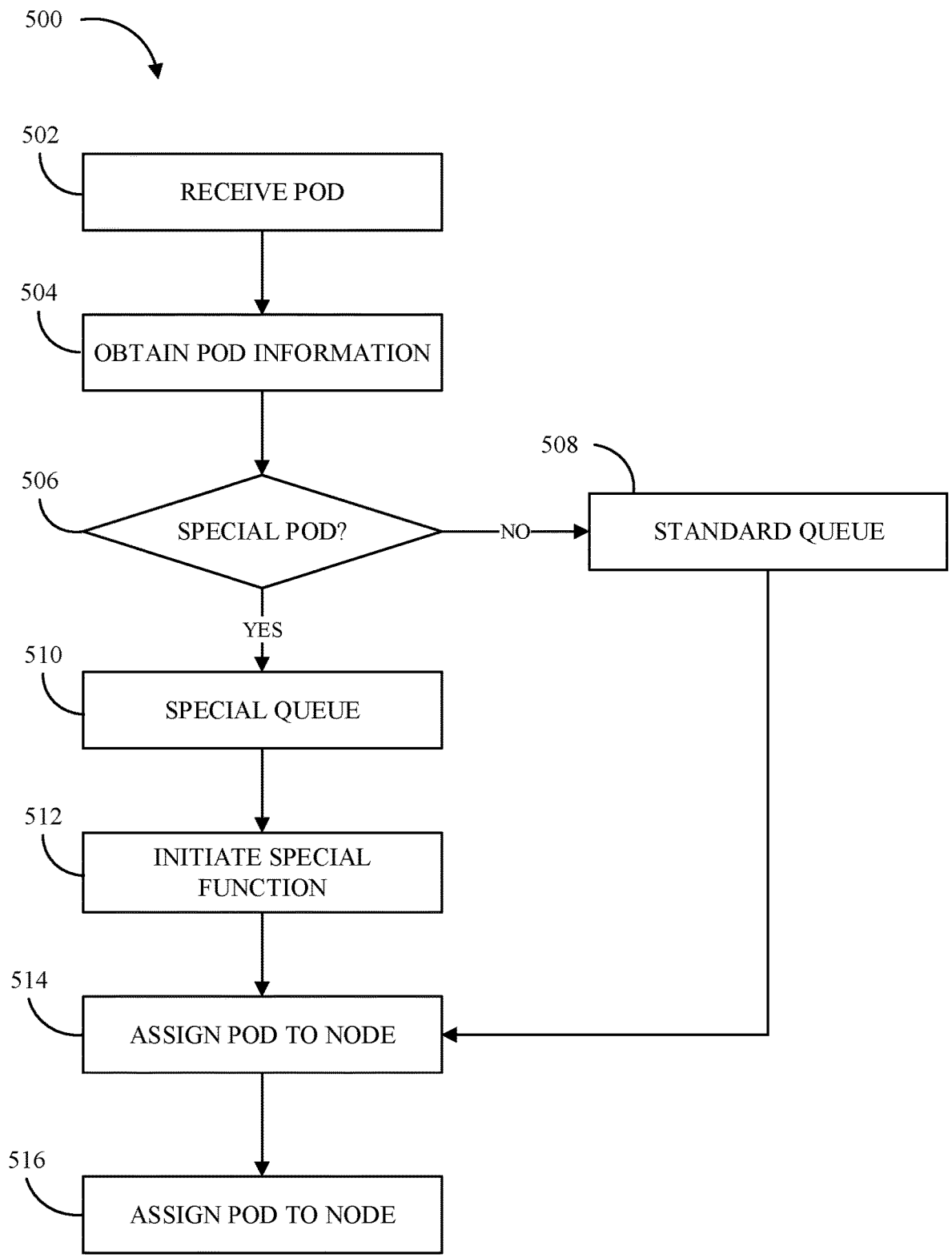
FIG. 5 illustrates a flow chart of an example method to operate a multi queue special function scheduler in accordance with some embodiments of the present disclosure.

FIG. 5 depicts a flowchart of an example method 500, for assigning special pods to special nodes. Method 500 can be performed in a computing environment (e.g., computing environment 400 and/or cloud computing environment 50). One or more of the advantages and improvements described above for using a special scheduling queue in parallel with a standard queue may be realized by method 500, consistent with various embodiments of the present disclosure.

Method 500 can be implemented by one or more processors, host 410, container manager 412, application 416, nodes 430, their subcomponents, and/or a different combination of hardware and/or software. In various embodiments, the various operations of method 500 are performed by one or more of host 410, container manager 412, application 416, scheduler 420 and/or its subcomponents, nodes 430, container client 431, pod 432, and container 433. For illustrative purposes, method 500 will be described as being performed by container manager 412.

At operation 502, container manager 412 receives/generates one or more pods. In some embodiments, container manager 412 generates the one or more pods. The generation can be in response to host 410 and/or application 416 providing instruction to generate the pods. In some embodiments, a user can initiate the receipt/generation of a pod. In some embodiments, the one or more pods are received by event handler 421.

In some embodiments, the pods are received from error handler 422. The received pod can be a pod that was previously assigned to a node and terminated. The termination can be in response to a node error (e.g., losing power, etc.). The termination can be instructed by container manager 412 (e.g., part of load balancing, normal operation of moving pods, etc.).

At operation 504, container manager 412 obtains pod information. In some embodiments, container manager 412 may analyze the received pod. Container manager 412 can determine a pod type, if the pod is marked special, one or more applications included in the pod, data type, pod type, and/or other information.

At operation 506, container manager 412 determines if the pod is a special pod. The determination can be based on the pod information obtained at operation 504. In some embodiments, a pod is determined to be special based on the pod being designated as special. In some embodiments, the pod is determined to be special based on a pod type, a pod source, and/or an application included in the pod. In some embodiments, the pod is determined to be special based on the type of data processed by the pod.

If it is determined the pod is a special pod (506:YES), then container manager 412 proceeds to operation 510. If it is determined the pod is not special, a standard pod, (506:NO), then container manager 412 proceeds to operation 508.

At operation 508, container manager 412 adds the standard pod to standard queue 425. Upon completion of operation 508, container manager 412 proceeds to operation 514.

At operation 510, container manager 412 adds the special pod to special queue 426. At operation 512 container manager 412 initiates/performs the special function on the special pod. In some embodiments, all of the special functions for the pod can be performed. In some embodiments, the special function performed is based on the results of operation 504. More than one special function can be performed on each pod.

At operation 514, container manager 412 assigns the pod to a node from the appropriate queue. In some embodiments, the assignment is based on placement rules 423. Container manager 412 monitors the availability and capability of each node, and selects an appropriate node for the queue. In some embodiments, a special rule set included in placement rules 423 is used to place special nodes and a standard rule set is used for the standard nodes. In some embodiments, one or more nodes are designated as special nodes. A special node is any node that can run a particular special node. For example, a first special feature can require a first special node, and second special function can require a second special node. In some embodiments, a special node can be any node that meets a minimum set of requirements to operate the special node. The minimum set of requirements can be obtained from placement rules 423 and/or obtained from the pod in operation 504. In some embodiments, a standard node can be assigned to a special node. This can occur when the special queue is empty and/or the special node meets all other rules of the standard set of rules. In these embodiments, the standard node can be terminated in response to a new pod being added the special queue and needing deployment to the special node.

In some embodiments, the special queue pods are assigned prior to the standard queue pods. This allows computing resources to be allocated to higher priority tasks.

In some embodiments, the queues are assigned in parallel. For example, assume a first pod is in the special queue, and a second pod is in the standard queue. The special queue can be performing the special function on the first pod. During this time, and based on available resources, container manager 412 can assign the second pod to an appropriate node. As soon as the special function is complete, container manager 412 can assign the first pod to an appropriate node. This can increase the overall efficiency of the system. One example efficiency benefit is that the second node can be deployed and not wait in a single queue behind the first pod while the special function is performed.

At operation 516, container manager 412 operates the pods. The operation can include monitoring, balancing, managing data transfer, and other tasks associated with operation of one or more pods. In some embodiments, operation 516 includes terminating the pod. The termination can be temporary (e.g., for rebalancing), or more permanent (e.g., batch workload complete).

The operations of method 500 are described for a single pod. However, the operations of method 500 can be performed in parallel for more than one pod simultaneously. For example, it is possible to have a bottleneck of pods in the queues. Operations 502 and 504 may be performed multiple times as pods are added to the queues at a faster rate than the pods are assigned to nodes.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a scheduler, a first pod including a first container and a second pod including a second container, wherein the scheduler includes a first queue, a second queue, an event handler, and an error handler, the first container being a ready to run software package;
obtaining a first set of characteristics for the first pod and a second set of characteristics for the second pod using the event handler;
determining, based on the first set of characteristics, that the first pod is a special pod and determining, based on the second set of characteristics, that the second pod is a standard pod;
adding the first pod to the first queue, wherein the first queue is a special queue and includes a special function, adding a second pod to the second queue;
performing the special function for the first pod based on the determining;
assigning, based on one or more placement rules, the first pod to a first remote computing node of a plurality of remote computing nodes; and
assigning, based on the one or more placement rules, the second pod to a second remote computing node of the plurality of nodes while the special function for the first pod is being performed.

2. The method of claim 1, wherein the assigning the second pod to the second node is in response to the assigning the first pod to the first node.

3. The method of claim 1, wherein the first remote computing node is a special node and the second remote computing node is a standard node.

4. The method of claim 1, wherein the special function includes a vulnerability scanner configured to analyze the first pod for a security risk.

5. The method of claim 1, wherein the special function includes a key management system configured to manage the lifecycle of an encryption key.

6. The method of claim 1, wherein the special function includes a compliance manager configured to detect and mitigate regulatory risks.

7. The method of claim 1, wherein the first pod is the special pod based on an indication of being special in the set of characteristics.

8. The method of claim 1, wherein the first pod is the special pod based on the pod including personal information.

9. The method claim 1, wherein the first pod is the special pod based on the pod including financial transaction data.

10. The method of claim 1, further comprising:
re-receiving the first pod;
determining, by the error handler, that the first pod was terminated from the first remote computing node and the first pod is the special pod;
sending, by the error handler, the first pod to the first queue; and
assigning the first pod to an available node of the plurality of remote computing nodes.

11. The method of claim 1, where the special queue includes a first special function and the second queue includes a second special function at least partially distinct from the first special function.

12. The method of claim 11, wherein the first special function and the second special function each include multiple functions, and at least one of the multiple functions is shared between the first special function and the second special function.

13. The method of claim 11, wherein the first special function and the second special function each include multiple functions, and none of the multiple functions are shared between the first special function and the second special function.

14. A cloud computing system comprising:
a plurality of nodes including a first remote computing node and a second remote computing node, wherein the first node is configured to run one or more standard containers and the second node is configured to run one or more special containers; and
a container scheduler to manage a lifecycle of a plurality of pods, where each pod of the plurality of pods includes one or more containers, the container scheduler comprising:
a processor;
a computer-readable storage medium communicatively coupled to the processor and storing program instructions;
a first queue configured to assign each pod in the first queue to the first remote computing node based on a set of scheduling rules while a special function of a pod in a second queue is being performed, wherein each pod in the first queue is a standard pod;
a second queue configured to assign each pod in the second queue to the second remote computing node based on the set of scheduling rules, wherein each pod in the second queue is a special pod;
an event handler configured to receive each pod of the plurality of pods, obtain a set of characteristics for each pod, assign each special pod to the second queue, and send each standard pod to the first queue; and
an error handler configured to determine that a pod has been terminated from a remote computing node, send each special pod to the second queue, and send each standard pod to the first queue.

15. The system of claim 14, wherein the second queue is further configured to perform a special function on the special pods.

16. The system of claim 15, wherein the second node is further configured to perform the special function on the special container.

17. The system of claim 15, wherein the special function includes a vulnerability scanner configured to analyze the first pod for a security risk.

18. The system of claim 15, wherein the special function includes a key management system configured to manage the lifecycle of an encryption key.

19. The system of claim 15, wherein the special function includes a compliance manager.

20. A computer program product, the computer program product comprising a computer readable storage medium having program instructions embodied therewith, the program instructions executable by a processing unit to cause the processing unit to:

receive, by a scheduler, a first pod including a first container and a second pod including a second container, wherein the scheduler includes a first queue, a second queue, an event handler, and an error handler, the first container being a ready to run software package;

obtain a first set of characteristics for the first pod and a second set of characteristics for the second pod;

determine, based on the first set of characteristics, that the first pod is a special pod, and determining, based on the second set of characteristics, that the second pod is a standard pod;

add the first pod to the first queue, wherein the first queue is a special queue and includes a special function, add the second pod to the second queue;

perform the special function for the first pod; and assign, based on one or more placement rules, the first pod to a first remote computing node of a plurality of remote computing nodes; and assign, based on the one or more placement rules, the second pod to a second remote computing node of the plurality of nodes while the special function for the first pod is being performed.

* * * * *